(12) United States Patent
Motamed et al.

(10) Patent No.: US 7,081,969 B1
(45) Date of Patent: Jul. 25, 2006

(54) AUTOMATIC PRINT LOAD BALANCING

(75) Inventors: Margaret Motamed, Foster City, CA (US); Ravi Someshwar, Redwood City, CA (US); Ravindranath Gunturu, Newark, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 1029 days.

(21) Appl. No.: 09/693,518

(22) Filed: Oct. 19, 2000

Related U.S. Application Data

(60) Provisional application No. 60/160,414, filed on Oct. 19, 1999.

(51) Int. Cl.
*G06F 15/00* (2006.01)

(52) U.S. Cl. .................... 358/1.16; 358/1.15

(58) Field of Classification Search ............. 358/1.15, 358/1.14, 1.18, 1.17, 1.1, 1.4, 1.9, 1.12, 1.13, 358/1.5, 296, 400, 402, 406, 407, 1.16
See application file for complete search history.

(56) References Cited

U.S. PATENT DOCUMENTS

| | | | |
|---|---|---|---|
| 5,450,571 A | | 9/1995 | Rosekrans et al. |
| 5,625,757 A | * | 4/1997 | Kageyama et al. ........ 358/1.14 |
| 5,880,447 A | * | 3/1999 | Okada et al. ............... 235/380 |
| 6,275,299 B1 | * | 8/2001 | Beck .......................... 358/1.15 |
| 6,348,971 B1 | * | 2/2002 | Owa et al. .................. 358/1.15 |
| 6,449,054 B1 | * | 9/2002 | Cox et al. ................... 358/1.15 |
| 6,452,692 B1 | * | 9/2002 | Yacoub ....................... 358/1.15 |
| 6,498,656 B1 | * | 12/2002 | Mastie et al. .............. 358/1.15 |
| 6,606,162 B1 | * | 8/2003 | Simpson .................... 358/1.15 |
| 6,650,431 B1 | * | 11/2003 | Roberts et al. ............ 358/1.15 |
| 6,707,566 B1 | * | 3/2004 | Endoh ........................ 358/1.15 |
| 2001/0043357 A1 | * | 11/2001 | Owa et al. .................. 358/1.15 |
| 2003/0123079 A1 | * | 7/2003 | Yamaguchi et al. ....... 358/1.15 |
| 2004/0042042 A1 | * | 3/2004 | Utsunomiya ............... 358/1.15 |
| 2004/0061896 A1 | * | 4/2004 | Shimada .................... 358/1.15 |

FOREIGN PATENT DOCUMENTS

| | | | | |
|---|---|---|---|---|
| EP | 0729090 A1 | 8/1996 | | 3/12 |
| EP | 0917044 A2 | 5/1999 | | 3/12 |

* cited by examiner

*Primary Examiner*—Mark Wallerson

(57) ABSTRACT

Methods and apparatus are provided for print load balancing, cluster printing and color and black-and-white page splitting. Print load balancing methods and apparatus route print jobs to the most available printer or split printing over more than one printer. Cluster printing methods and apparatus specify a group of printers from which a print job can be performed. Color and black-and-white page splitting methods and apparatus split a print job, and send non-color pages to black-and-white printers and pages with color to color printers.

11 Claims, 5 Drawing Sheets

AUTOMATIC PRINT LOAD BALANCING

This application claims priority from Provisional Patent Application No. 60/160,414 filed Oct. 19, 1999.

BACKGROUND OF THE INVENTION

1. Technical Field

The invention relates to printing. More particularly, the invention relates to an apparatus and to a family of methods which reduces print times by using cluster printing, print load balancing and color and black-and-white page splitting.

2. Description of the Prior Art

Prior art attempts to reduce the time it takes to complete a print job have focused mainly on improving hardware performance. No prior art has attempted to reduce print times by dividing a print job across all available resources.

Typically, a large company will occupy a large office space with a multitude of computers and printers, all networked together. The multitude of printers is acquired to handle peak periods of printing so that there will not be a slow down. However, outside of peak periods there are many idle times in which many a printer will not be in use.

This makes for a highly inefficient scheme because, although there are available printers, a user cannot take advantage of all of them. A user typically selects a single printer and performs the entire print job on that printer. What is needed is a method and/or apparatus that would allow the use of many or all available printers to simultaneously perform a print job. In that way the total time to complete a single print job can be reduced.

SUMMARY OF THE INVENTION

The apparatuses and methods described herein implement a novel and unique facility that decrease the time taken to perform a print job. This is accomplished by print load balancing, cluster printing and color, black-and-white page splitting.

The print load balancing consists of several aspects. One aspect is to route print jobs to the most available printer based on factors such as color, black-and-white printing, printing page per minute rates, the number of pages in a job, size and number of copies in a job. Another aspect is to split the printing over more than one printer where there are several copies to be made. Yet another aspect is to split the printing of page over more than one printer for a single document.

Cluster printing consists of specifying a group of printers from which a print job can be performed.

Color/black-and-white page splitting consists of splitting a printer job by sending non-color pages to black-and-white printers and sending pages with color, to color printers.

DESCRIPTION OF THE PREFERRED EMBODIMENT

The apparatuses and methods described herein implement a novel and unique facility that decrease the time taken to perform a print job. This is accomplished by print load balancing, cluster printing and color, black-and-white page splitting.

Figure 1:
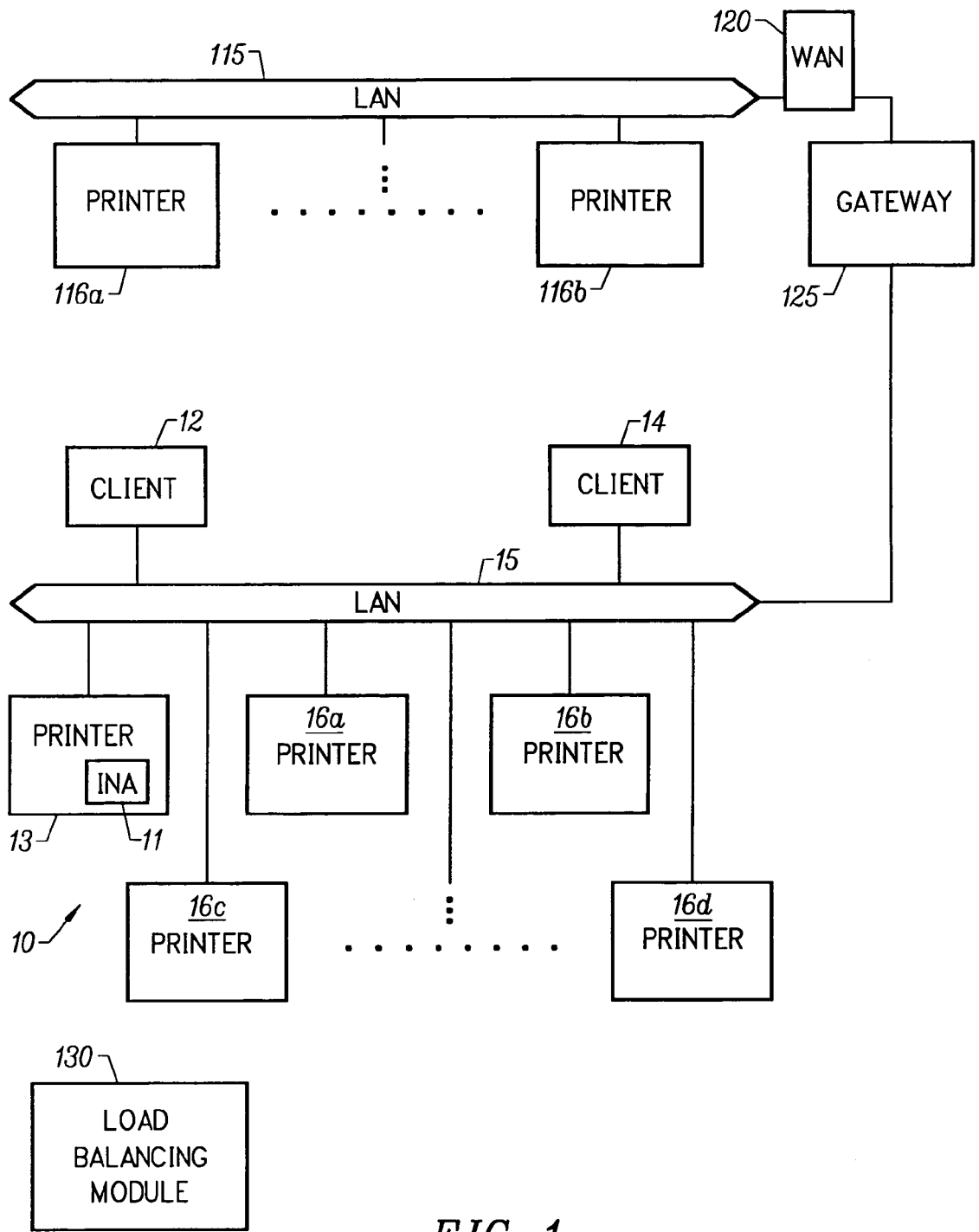
FIG. 1 is an overall system view of a multi-user local area network system that includes several printers.

FIG. 1 shows an exemplary interface between multiple host computers 12 and 14 and multiple printers, generally designated by the index numerals 13, 16a, 16b, 16c, and 16d. Printer 13 includes an internal network adapter 11, located within the printer housing and the other printers also preferably include such a network adapter. Network adapter 11 is connected to host computers 12 and 14 through a network, such as the local area network (LAN) 15.

Additionally, two or more LAN's 15, 115 (including additional printers 116a, 116b) may be interconnected over a WAN 120, such as the Internet, via one or more gateways 125. In such configuration, a segmented network is provided. The gateway conserves WAN bandwidth by routing only those print jobs to the WAN that need to access a remote printer.

The host computers 12 and 14 can be installed in close proximity to one or more of the printers of FIG. 1, however, when operated according to the principles of the present invention, such host computers can be located quite remote from these printers, as discussed above. The overall system, generally designated by the index numeral 10, can be spread in practical use on a single floor, across an entire building, or across several buildings. Each of the printers 13, 16a, 16b, 16c, and 16d, may be of the same type or of different models. Such preferred printers can be either black-and-white or color printers.

A load balancing module 130 implements various inventive features discussed herein, and may be located in a single location, or may be distributed. In either event, the load balancing module may be located in a printer, a client, or a gateway.

Cluster Printing

Cluster printing consists of specifying a group of printers from which a print job can be performed.

A first step in this process is to identify all available printers from which a user may select printer clusters or groups from. For purposes of clarification the term printer and fiery may be used interchangeably.

Figure 2:
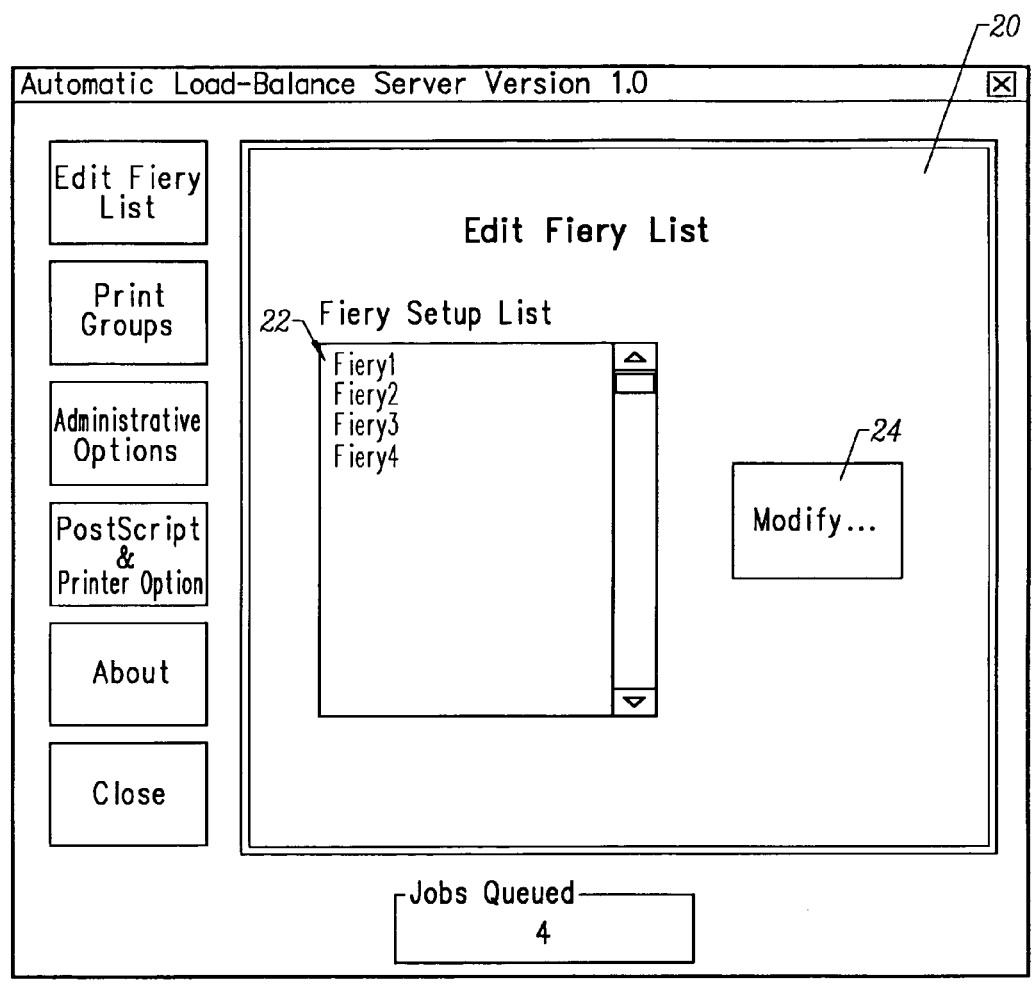
FIG. 2 is graphical interface window that shows the current list of selected printers.
Figure 3:
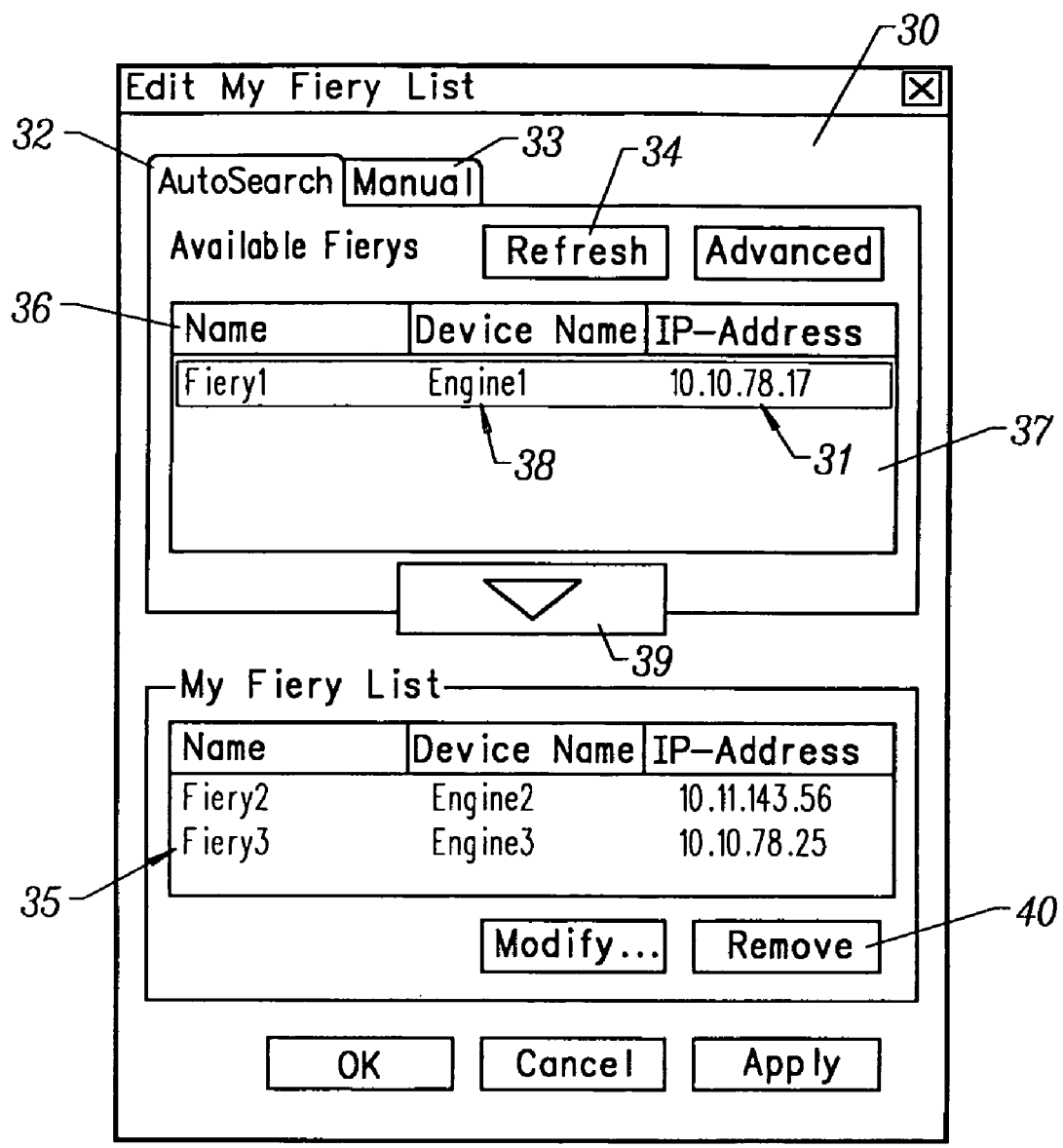
FIG. 3 is a graphical interface window that allows the user to modify the current list of selected printers.

FIG. 2 is the Edit My Printer List window 20 that shows the current list of selected printers 22 available. A user may modify this list by selecting the Modify button 24. Selecting the Modify button opens a sub-window 30 as shown in FIG. 3.

One method to find available printers is by selecting the AutoSearch tab 32 which starts a search across the local network for connected printers. Selection of the Refresh button 34 causes the local network to be searched again. The user can also search for printers by selecting IP addresses that fall within a user specified range (not shown). Once a printer is found its name 36 device name 38 and IP address 31 are displayed in the available window 37. Another method is to search for the printers manually. Selecting the Manual tab 33 allows a user to search for a printer by domain name or by entering a specific IP address (not shown).

To make an available printer part of the printer pool 35 from which groups may be selected, a user highlights the printer in the available window 37, then presses the center button 39. The highlighted printer then moves to the printer pool 35. A user removes a printer from the printer pool list by highlighting the printer and pressing the Remove button 40. The printer is then returned to the available printer list 37.

Selection of the Modify 24 button also allows the user to change a printer's name (not shown)

Once the printer pool is created, a user may then create print groups. Print groups are groups of printers that can be designated as the group to be load balanced to. A print group can be of any choice the user desires, but is typically created based on the spatial relationship to the user. For example, a user working on the first floor of his office building would likely create a print group containing all the printers on the first floor. This would allow easy access to all the printers performing the group print job.

Figure 4:
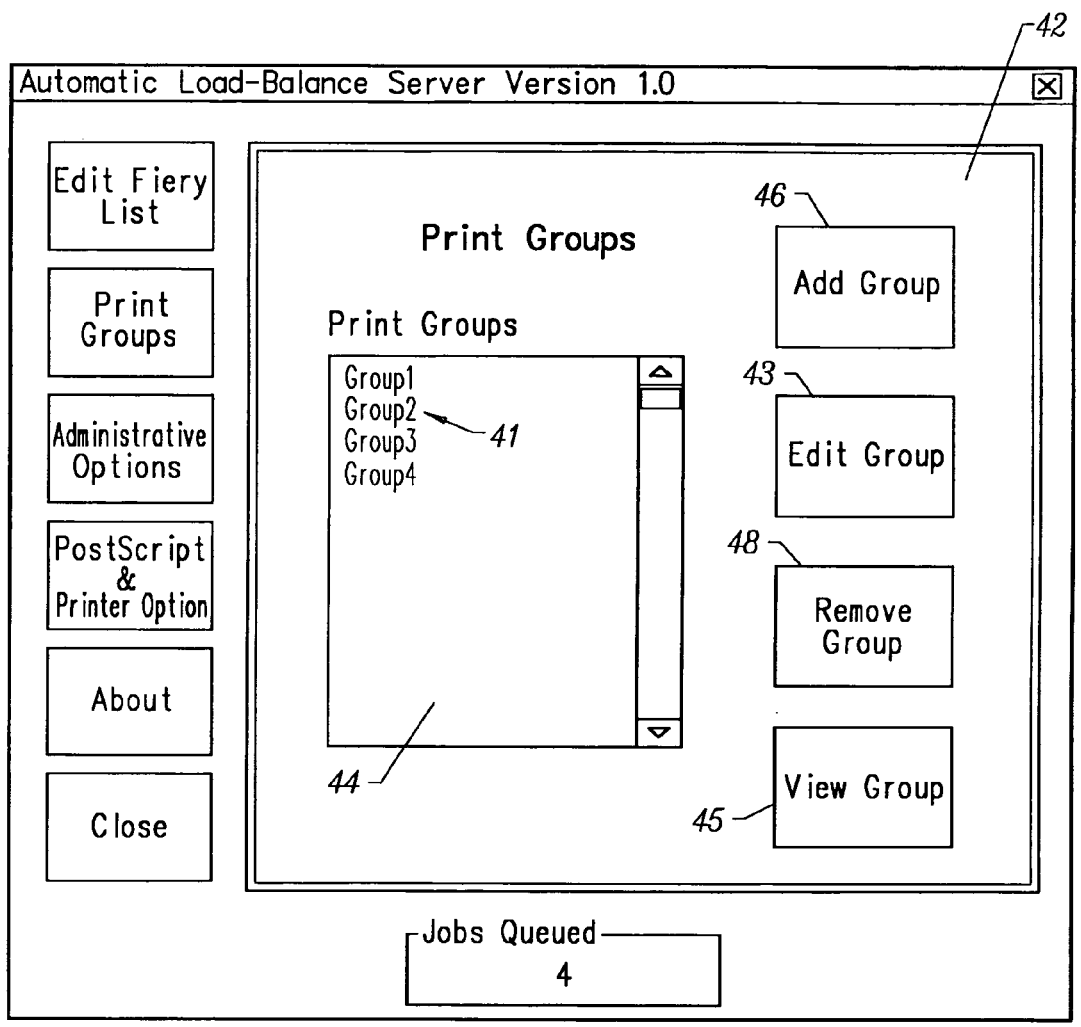
FIG. 4 is a graphical interface showing the available print groups.
Figure 5:
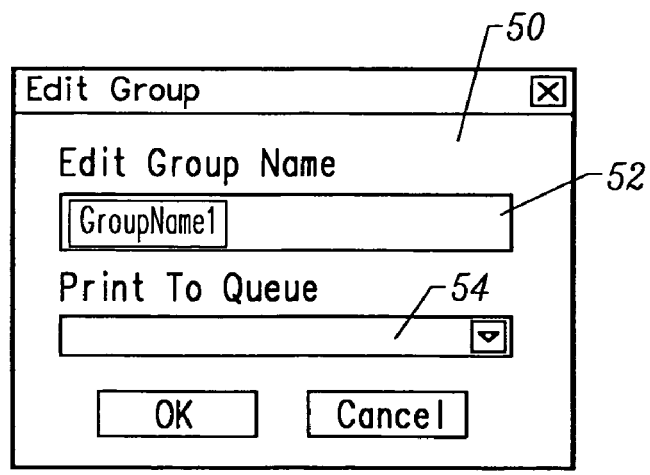
FIG. 5 is a graphical interface that allows a user to modify the name of a print group.

FIG. 4 is the Print Groups window 42 showing available print groups 44. A user is able to add or remove a group by selecting the Add 46 or Remove 48 buttons respectively. Highlighting a group 41 and selection of the Edit Group button 43 opens a sub-menu as shown in FIG. 5. From this menu a user can change the group name by entering it into the Edit Group Name box 52. A user can also select to Direct, Hold or Print in the Print To Queue box 54.

Figure 6:
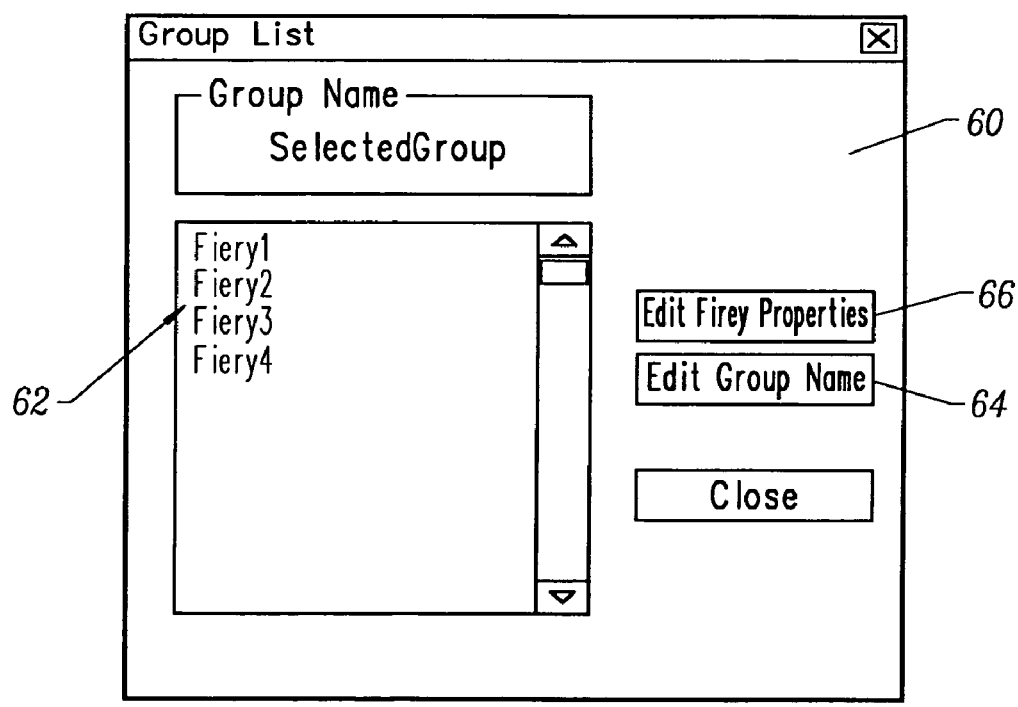
FIG. 6 is a graphical interface that lists the printers assigned to a particular print group.

Referring again to FIG. 4, selecting the View Group button 45 opens up the Group List window 60 shown in FIG. 6. This window lists the printers 62 assigned to that group. Selecting the Edit Group Name button 64 opens the Edit Group 50 window as previously described. Selecting the Edit Fiery Properties button 66 opens the Edit My Fiery List window 30 as previously described.

Errors often occur with printers. Thus, within a cluster of printers a user may set for automatic rerouting of a print job to another printer if the first selected printer is unable to perform a print job. A user may also specify a timeout period before the job is rerouted. In that way the user is given time to fix the problem. This is helpful when the printer problem can be easily fixed, for example where there is a paper jam or the printer is out of paper.

Print Load Balancing

Print load balancing consists of several aspects. One aspect is to route print jobs to a printer based on such factors as printing page per minute rates and the number of pages in a job. Another is aspect is to split the printing over more than one printer where there are several copies or sets to be printed. Yet another aspect is to split the printing over more than one printer when a single job has a high number of pages to print.

Printing Page Per Minute Rates

The print load balancing can be set so that the printer with the fastest printing will be chosen first. If the fastest printer is unavailable or in use, then the next fastest printer will be chosen. This hierarchal process is continued until either no printers are left or the available printers' print speed drops below a user specified threshold.

Number of Pages in a Job

Often it is desirable to split a single print job where the print job has high number of pages, for example 200. The user can specify the minimum number of pages a single job must be before the job is split up. Also, the user can specify the maximum number of printers the job will go to within a group. For example, a 200 page document is printed on five printers. Each printer prints forty pages with one printer printing pages 1–40, a second printer printing pages 41–80, a third pages 81–120, a fourth pages 121–160 and the fifth printer printing pages 161–200.

Number of Copies

Where a print job has multiple copies, settings are made so that the copies or sets will print over many printers. For example, where ten copies are desired and ten printers are available, each printer will print a single copy. A user sets the maximum number of printers used. If a user sets the maximum number of printers to five printers, and wishes to print ten copies, each printer will print two copies.

Color/Black-and-White Page Splitting

Color/black-and-white page splitting consists of splitting a printer job by sending non-color pages to black-and-white printers and sending pages with color, to color printers.

Choosing how the print job will be split depends on several factors. One factor is the availability of printers. Typically there are both color printers and black-and-white printers within a printer group. Where the entire print job lacks pages with color, the print job will be sent to black-and-white printers only.

Likewise, where a print job has color elements on every page, the entire print job will be sent to color printers only. However, the invention may readily be used to print all pages of a job in color or in black and white; to split the job so that color pages are routed to a color printer and black and white pages are routed to a black and white printer, or to apply an auto-detect scheme.

Where the print job has color and non-color pages, the non-color pages will be printed on black-and-white printers, while the pages with color are printed on color printers. The pages are then merged afterwards.

Several merge methods are available to collate print jobs that are split across multiple printers. One merge method is a manual method where a human person is relied upon to combine the non-color and color pages. Another method is the use of a coversheet and an external collator. The coversheet contains a machine and human readable barcode and is produced along with each print job. The coversheet contains instruction on how to merge the document. The coversheet and printed pages are inserted into an external is collator and the document is merged into its final format. The invention can use in-line collator. In such application, information on the cover sheet is machine readable. The invention can also use a human readable cover sheet. The cover sheet can be used to determine collation.

Other merge methods include letting each printer perform the collation.

Other Embodiments

Priority Printing

Several options are available to set the priority of a print job. Normally, print jobs are performed in the order they are queued. However, a user may set her print job on fastest or background. A fastest setting will move the print job to the front of the queue so that it will be printed first. If a print job is already being performed, a print job with a fastest setting will start printing afterward. All other queued print jobs will be printed in the order they were queued.

A print job with a background setting will wait until all other queued print jobs are printed first. For example, if a print job with a background setting is queued, it will be the last print job to be printed. If another print job is queued afterwards then that later queued print job will move ahead of the print job with the background setting. This will continue until there are no other queued print jobs. If there are two or more background print jobs, each background print job will be printed in the order in which they were queued, unless a non-background print job is queued. If that happens the non-background print job will be printed before both print jobs with the background setting.

Job Scheduling

The user can also schedule print jobs long into the future. The user inputs the time and date she wishes the print job to be performed. When the inputted date and time arrives, the print job is performed, e.g. through the printer driver.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

The invention claimed is:

1. A printing system comprising:
a means for searching for a plurality of printers coupled to a network to create a first printer list, the searching means adapted to allow a user to perform the search automatically or manually;
a first means for selecting a plurality of printers from the first list to create a second printer list, the first selection means adapted to allow the user to add or delete printers from the second printer list;
a second means for selecting a plurality of printers from the second printer list to create a third printer list, the second selection means adapted to allow a user to assign a group name to the third printer list;
a means for determining to which of the printers in the third printer list the print job is to be transmitted so as to balance the print job based upon a load balancing scheme;
a means for transmitting the print job to the determined printers based on the load balancing scheme; and
a means for printing the print job by the determined printers.

2. The apparatus of claim 1 wherein the load balancing scheme divides the print job by sets.

3. The apparatus of claim 1 wherein the load balancing scheme divides the print job by sending pages with no color to black-and-white printers and sends pages with color to color capable printers.

4. The apparatus of claim 1 wherein the load balancing scheme divides the print job by page number.

5. The apparatus of claim 1 wherein a printer from the third printer list printers is removed upon an error.

6. The apparatus of claim 1 wherein the print job has a user defined priority.

7. The apparatus of claim 6 wherein the priority puts the print job first amongst all queued print jobs.

8. The apparatus of claim 6 wherein the priority delays the print job until all other queued print jobs are performed.

9. The apparatus of claim 6 wherein the priority queues the print job at a specific date and time.

10. The apparatus of claim 6 wherein the user defined priority is a print speed threshold.

11. The apparatus of claim 1 wherein a print job is rerouted in the event of printer error based upon factors which may include any of the state of any or all, printers, the type of error, user defined options, and interactive options eligible.

* * * * *